(12) United States Patent
Tagore-Brage et al.

(10) Patent No.: US 8,009,569 B2
(45) Date of Patent: Aug. 30, 2011

(54) SYSTEM AND A METHOD FOR MAINTAINING QUALITY OF SERVICE THROUGH A CONGESTED NETWORK

(75) Inventors: Jens P. Tagore-Brage, Frederiksberg (DK); Martin E. Andersen, Malmö (DK); Ole C. Andersen, Herlev (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 1183 days.

(21) Appl. No.: 10/139,338

(22) Filed: May 7, 2002

(65) Prior Publication Data

US 2002/0172205 A1 Nov. 21, 2002

(51) Int. Cl.
*H04L 12/26* (2006.01)
*H04L 12/28* (2006.01)

(52) U.S. Cl. ........................... 370/236; 370/412
(58) Field of Classification Search ................. 370/235, 370/236, 236.1, 395.42, 395.43, 412–416, 370/418, 468
See application file for complete search history.

(56) References Cited

U.S. PATENT DOCUMENTS

| | | | | |
|---|---|---|---|---|
| 5,317,568 A * | 5/1994 | Bixby et al. | | 370/401 |
| 5,400,329 A * | 3/1995 | Tokura et al. | | 370/232 |
| 5,689,506 A * | 11/1997 | Chiussi et al. | | 370/388 |
| 5,777,984 A * | 7/1998 | Gun et al. | | 370/230 |
| 5,790,522 A * | 8/1998 | Fichou et al. | | 370/236 |
| 5,790,545 A * | 8/1998 | Holt et al. | | 370/398 |
| 5,995,486 A * | 11/1999 | Iliadis | | 370/229 |
| 6,147,969 A * | 11/2000 | Benmohamed et al. | | 370/230 |
| 6,172,963 B1 * | 1/2001 | Larsson et al. | | 370/229 |
| 6,188,698 B1 * | 2/2001 | Galand et al. | | 370/412 |
| 6,252,847 B1 * | 6/2001 | Lee | | 370/229 |
| 6,363,075 B1 * | 3/2002 | Huang et al. | | 370/412 |
| 6,542,507 B1 * | 4/2003 | Khacherian et al. | | 370/395.43 |
| 6,628,617 B1 * | 9/2003 | Karol et al. | | 370/237 |
| 6,657,962 B1 * | 12/2003 | Barri et al. | | 370/235 |
| 6,747,971 B1 * | 6/2004 | Hughes et al. | | 370/387 |
| 6,813,274 B1 * | 11/2004 | Suzuki et al. | | 370/412 |
| 6,859,435 B1 * | 2/2005 | Lee et al. | | 370/231 |
| 6,970,424 B2 * | 11/2005 | Fawaz et al. | | 370/232 |
| 2002/0163915 A1 * | 11/2002 | Wallner et al. | | 370/395.1 |
| 2003/0133406 A1 * | 7/2003 | Fawaz et al. | | 370/229 |

* cited by examiner

*Primary Examiner* — Hong Cho
(74) *Attorney, Agent, or Firm* — Klein, O'Neill & Singh, LLP

(57) ABSTRACT

In flow control, such as in Ethernet communication, the data is divided into queues of different priorities so that, when transmission is enabled, quality of service may be provided by first transmitting data of high priority. A networking element, such as a switch, a router, a bridge or a MAC, is adapted to transfer flow control information without awaiting its own buffer to fill. This reduces latency and facilitates the providing of networking elements without buffers.

14 Claims, 3 Drawing Sheets

SYSTEM AND A METHOD FOR MAINTAINING QUALITY OF SERVICE THROUGH A CONGESTED NETWORK

BACKGROUND OF THE INVENTION

The present method relates to a system and a method for processing data packets, and in particular to a new manner of handling flow control in networking elements.

A problem encountered in networking elements when the transmission rate is increased is seen in e.g. an Ethernet where, at 10 Gbit/s, each bit is 2 cm long on the transmission fiber. Thus, a 40 km fiber actually holds 2 Mbit at any point in time. According to the standard of flow control, this will mean that when the receiver's buffer gets too full, the receiver transmits a flow control stop signal to the transmitter. In a worst-case scenario, the transmitter has just started transmitting a maximum frame (1522 bytes) when receiving the FC stop signal. However, before the transmitter stops transmitting, the receiver still has to have a buffer for holding a total of 2×2 Mbit+2 maximum frames–that is, a total of approx. 1 Mbyte. This is a fact due to the chosen implementation of the flow control.

When the receiver reopens transmission, the transmitter will have buffered an amount of data received during the transmission pause. In prior art transmitters, this data will be stored in order and output in order. This, naturally, means that Quality of Service is not provided and that there is a risk of loosing high priority packets due to the buffers being full or due to ageing.

This problem is caused by the prior art transmitters—or transmitting parts of standard network equipment—having the buffers placed before the analyzers.

SUMMARY OF THE INVENTION

The present invention relates to a solution to that problem, and in a first aspect, the invention relates to a system for processing data packets or frames, the system comprising:
  means for providing the data packets or frames,
  analyzing means for providing, for each data packet or frame provided, one priority of a plurality of priorities,
  queue means for storing the data packets or frames in each of a number of queues each relating to one or more of the plurality of priorities,
  one or more outputs for outputting the provided, analyzed, and stored data packets or frames,
  means for transferring each data packet or frame from the queue means to an output,
wherein the transferring means are adapted to receive stopping information and to, upon receipt thereof, stop transfer of data packets or frames from at least one of the queues to at least one output.

Thus, the data to be buffered is analyzed and put into prioritised buffer queues. Each queue may relate to more than a single priority, but the queues all relate to different (sets of) priorities. In this manner, upon reopening of transmission to a receiver, the data may be output as desired from these queues.

In this context, the means for providing the data may be an input port or a means actually generating the data. An input port may comprise e.g. a MAC for having the communication on the port conform to e.g. the Ethernet standard. Naturally, the same is the situation for the output(s).

A priority may be defined in a standard, such as the Differentiated Service in Ethernet packets. Alternatively or additionally, one or more parts of the packets or frames may be analyzed in order to identify one or more features or combination of features therein. Each such feature or combination of features may have a corresponding priority, and the packet or frame will be assigned the priority of one of the features identified.

Normally, a priority will be an integer between 0 and 63, such as between 0 and 8. However, a priority may be represented by any sign or character as long as it is determinable (and this may simply be defined) which of two different priorities is the highest. Finally, a priority may also be an interval of e.g. integers.

Naturally, the queue means may be implemented in any manner—such as as a number of separate memories each holding one or more queues or a single memory holding all queues. When more queues are present in a memory, each queue may be implemented as a linked list. Also, the full data packet or frame may be stored in one piece or a number of separate pieces. In addition, it may be desired to actually only store part of the packet or frame, if the remaining part(s) thereof may be regenerated when the packet or frame is to be retrieved and further processed.

In most instances, the transferring means will transfer a data packet or frame to a single output. However, if the packet or frame is a multicast frame or a broadcast frame, the packet or frame may be transmitted to a plurality of outputs.

The stopping information may be received from a networking element receiving data packets or frames output from one or more of the outputs, such as an input connected to the same networking element. In normal flow control operation, the present system will also be adapted to receive data packets or frames from the receiving networking element—and part of those packets or frames will be flow control packets informing the present system of the status of the receiving networking element.

Another manner of identifying that the receiving networking element is not able to receive more data will be when it does not acknowledge receipt thereof. In this manner, the stopping information may be generated internally in the system by a monitoring means monitoring the transmission and acknowledgements and which signals when an expected acknowledgement is not received.

Naturally, under all circumstances, the data packets or frames may conform to any known standard—or to none at all—and may be of a fixed or variable size.

The stopping information may inform the system to only stop certain (normally the lower) priorities from being transmitted—while higher priorities may still be transmitted. Alternatively, the transferring means could be adapted to, upon receipt of the stopping information, stop transfer of data packets or frames from all queues to at least one output— normally in an embodiment where the system comprises a plurality of outputs. In this manner, the other outputs may be able to transmit even though one receiver is congested.

Preferably, the transferring means are adapted to receive the stopping information via the one or more outputs—or inputs connected to the same networking element(s). Normally, the transferring means will receive transmission information at regular intervals. Also, a congested receiver may transmit stopping information at regular intervals, and the transferring means may stop transfer until no stopping information has been received in a period of time exceeding the regular interval.

In one embodiment, the system will comprise a plurality of outputs and wherein the transferring means comprises output queue means for holding data to be output from each of the outputs, wherein the transferring means are adapted to transfer the data packets from the queue means to the relevant output queue means and from the output queue means to the respective outputs.

In this situation, it is preferred that the output queue means actually implements not only a single queue for each output but a number of queues so that, for each output, prioritised queues (as the queue means) receive data packets or frames with different priorities. An easy implementation would be one where the number of output queue means for each output corresponds to the total number of priorities or queues in the queue means.

Especially when the transferring means are adapted to transfer data packets or frames from a higher priority queue means before a lower priority queue means to the respective output queue means, any stopping and reopening of transmission to a receiver will implement Quality of Service in that the buffered higher priority packets are transmitted first. In the situation where the output queue means also have prioritised queues, an even better performance is achieved.

In a preferred embodiment, in fact, the functionality of the above queue means and output queue means are combined and the queue means are provided with one queue for each priority for each of a plurality of outputs. In this manner, each data packet or frame may be transferred to the correct output/priority at once.

When the providing means and each output is adapted to provide and output data packets or frames at a predetermined rate (such as measured in frames /sec or bits/bytes /sec), preferably the analyzing means are adapted to analyze the data frames or packets with at least the predetermined rate. It is even more preferred that the analyzing means are adapted to analyze the data frames or packets at least a rate corresponding to the total predetermined outputting rate of all outputs.

Preferably, the queue means are adapted to, in each queue, hold data packets or frames in the order in which they were received. Such queues may be implemented as a FIFO.

As described, the queue means may comprise a single memory and each queue may be implemented as a linked list of data packets or frames. When the total amount of data to be buffered. is defined by latency in a flow control system—the amount of data to buffer is defined by the transmission rate and the time between a receiver receiving data from the system is congested until a transmitter transmitting data to the present system is stopped. In this manner, a single memory with the queues as linked lists may be defined with no prior knowledge of the composition of the data (as to priority). Otherwise, the individual prioritised queues might be required to be dimensioned to handle the full amount of data. This amount of data will depend both on the transmission rate and distance. Preferably, the queue means are adapted to hold at least 1 Mbit, such as at least 4 Mbit, preferably at least 6 Mbit, such as at least 1 Mbyte of data.

In the same manner, the output queue means may comprise a single memory and each output queue may be implemented as a linked list of data packets or frames. Also, the output queue means may be adapted to hold at least 1 Mbit, such as at least 4 Mbit, preferably at least 6 Mbit, such as at least 1 Mbyte of data.

It is especially desired that the prioritised queues are adapted to buffer a large amount, if not all, of the data to be buffered.

Preferably, the analyzing means are also adapted to determine, on the basis of one or more predetermined parts of each data packet or frame, from which output the data packet or frame should be output. In normal systems, this is obtained by learning and creation of a lookup table or function where networking information (such as MAC addresses or IP addresses) is combined with output port numbers.

One type of networking element where the present system is useful is one where the providing means comprise a number of inputs adapted to receive the data packets or frames from an external network. An element of this type may be a switch or a hub.

In a second aspect, the invention relates to a method for processing data packets or frames, the method comprising:
  providing the data packets or frames,
  providing, for each data packet or frame provided, one priority of a plurality of priorities,
  storing the data packets or frames in one of a number of queues each relating to one or more of the plurality of priorities,
  receiving each data packet or frame from the queues and outputting the data packet or frame from one or more outputs,
wherein the receiving and outputting step comprises receiving stopping information and stopping transfer of data packets or frames from at least one of the queues to at least one of the outputs.

In one embodiment, the receiving and outputting step comprises stopping transfer of data packets or frames from all queues to at least one of the outputs.

Preferably, the receiving and outputting step comprises receiving the stopping information via the one or more outputs.

In one embodiment, the receiving and outputting step comprises the steps of:
  transferring the data packets or frames from the queues to an output queue means for holding data to be output from the respective one of a plurality of outputs,
  transferring the data packets from the queues to the relevant output queue means and from the output queue means to the respective outputs.

Then, the receiving and outputting step may comprise transferring data packets or frames from a higher priority queue before a lower priority queue to the respective output queue means.

When the step of providing the data packets or frames and each output outputs data packets or frames with a predetermined rate (such as measured in frames/sec or bits/bytes /sec), the step of providing a priority is preferably performed with at least the predetermined rate. Even more preferably, the providing of the priority is performed with at least a rate corresponding to the total predetermined outputting rate of all outputs.

In the preferred embodiment, the storing step comprises storing each data packet or frame in a queue corresponding to an output from which it should be output and to the priority assigned. In this manner, a queue is provided for each priority and for each output.

In another embodiment, the receiving and outputting step comprises receiving data packets from each of the queues and outputting the data packets or frames from one of a plurality of outputs.

Preferably, the storing step comprises storing the data packets or frames in each queue in the order in which they were received.

Also, the storing step may comprise storing the data packets or frames in a single memory, each queue being implemented as a linked list of data packets or frames.

Preferably, the storing step comprises storing the data packets or frames in queues implemented in a memory adapted to hold at least 1 Mbit, such as at least 4 Mbit, preferably at least 6 Mbit, such as at least 1 Mbyte of data.

In addition, the storing step may comprise storing the data packets or frames in a single memory, each output queue being implemented as a linked list of data packets or frames.

Further, the transferring step may comprise transferring the data packets or frames to output queue means implemented in a memory adapted to hold at least 1 Mbit, such as at least 4 Mbit, preferably at least 6 Mbit, such as at least 1 Mbyte of data.

In general, the system preferably comprises the step of analyzing one or more predetermined parts of each data packet or frame in order to determine from which output the data packet or frame should be output.

As mentioned above, an especially interesting embodiment is one where the step of providing the data packets or frames comprises providing the data packets or frames from a number of inputs adapted to receive the data packets or frames from an external network. A method of this type may be used in a switch or a hub.

A very interesting networking element may be seen in a third aspect relating to a networking element having:
- a first input/output connected to a first link communicating with a second networking element, the first I/O being adapted to receive data from the second networking element and to transmit stopping/congestion information to the second networking element,
- a second input/output connected to a second link communicating with a third networking element, the second I/O being adapted to transmit data to the third networking element and to receive stopping/congestion information from the third networking element,
- first means for receiving data from the first I/O and transmitting data to the second I/O,
- second means for receiving stopping/congestion information from the second I/O and transmitting stopping/congestion information to the first I/O, the second means being adapted to, upon receipt of the stopping/congestion information from the second I/O, transmit stopping/congestion information to the first I/O without delay.

In this context, the first networking element may be a switch, a router or just a Media Access Controller. This element is adapted to transfer data (maybe with some intermediate analysis or alteration) from one I/O to another. In the opposite direction, stopping/congestion information may be transferred (maybe also with some intermediate analysis or alteration) in order for the third networking element to signal that it is no longer interested in—or able to—receive additional data.

Normally this stopping/congestion information may be pause frames, flow control information or other congestion signaling adapted to provide e.g. back pressure or the like and to ensure that buffers do not overflow in the system.

In normal networking elements, all networking elements would have buffers and merely stop transmission of data to the congested receiver. The networking element would then itself keep receiving data and simply store this. When the buffer of the networking element is also congesting, the networking element would then assert back pressure on the networking element from which it receives data in order for that to then stop transmitting.

This type of communication has the disadvantage that all networking elements need buffers and need to assert back pressure or the like upon a certain degree of filling or congestion of the buffer. This provides some latency in the stopping of the actual data transmitter—and requires all networking elements to have buffers.

The present networking element transmits the stopping/congestion information as soon as it receives it. In this manner, there is no waiting for any buffer of the networking element to fill. Also, the actual transmitter of the data is stopped sooner. In this context, "without delay" will mean that the stopping/congestion information is transmitted as soon as possible. Inevitable delays may occur due to analysis/alteration of the stopping/congestion information or waiting for the link to the second networking element to become available.

Thus, in one embodiment, the first means and the first and second I/O's each comprise no more data storage than that required for holding a single data packet or frame. This is not required in that the second networking element is stopped as soon as possible.

In another embodiment, at least one of the first means and the first and second I/O's comprises a data storage, but then the second means is adapted to transmit the stopping/congestion information independently of a degree of filling/congestion of the data storage. Naturally, a storage may be provided if desired.

The first means could be adapted to stop transmission of data to the second I/O when the first means has received stopping/congestion information. In this situation, a storage would be desired in order to then store any data received until the second networking element stops transmitting data.

Alternatively, the first means could be adapted to maintain transmission of any data received from the first I/O to the second I/O when the first means has received stopping/congestion information. In this situation, which may be termed a cut-through operation, no buffer is required.

Another aspect relates to communication system comprising:
- a first networking element according to the third aspect,
- a second networking element communicating with the first networking element via the first I/O of the first networking element and
- a third networking element communicating with the first networking element via the second I/O of the first networking element, the second networking element being adapted to transmit data to the first I/O, to receive stopping/congestion data from the first I/O, and to stop transmission of data upon receipt of stopping/congestion data, the third networking element being adapted to receive data from the second I/O and to transmit stopping/congestion data to the second I/O.

A fifth aspect relates to a method of receiving and transmitting data in and from a networking element, the method comprising:
- receiving, on a first input/output of the networking element connected to a first link communicating with a second networking element, data from the second networking element and transmitting stopping/congestion information to the second networking element,
- transmitting, on a second input/output of the networking element connected to a second link communicating with a third networking element, data to the third networking element and receiving stopping/congestion information from the third networking element,
- in a first means, receiving data from the first I/O and transmitting data to the second I/O,
- in a second means, receiving stopping/congestion information from the second I/O and transmitting stopping/congestion information to the first I/O, the second means, upon receipt of the stopping/congestion information from the second I/O, transmitting stopping/congestion information to the first I/O without delay.

Again, the first means and the first and second I/O's could each store, at each point in time, no more data storage than that required for holding a single data packet or frame.

Alternatively, at least one of the first means and the first and second I/O's could store data, and wherein the second means could transmit the stopping/congestion information independently of an amount of data stored.

Also, the first means could stop transmission of data to the second I/O when the first means has received stopping/congestion information. Alternatively, the first means could maintain transmission of any data received from the first I/O to the second I/O when the first means has received stopping/congestion information.

A final aspect relates to a method of operating the system according to the third aspect, the method comprising:

during transmission of data from the second networking element to the first I/O of the first networking element and from the second I/O of the first networking element to the third networking element, transmitting stopping/congestion information from the third networking element to the second I/O of the first networking element, with no delay transmitting stopping/congestion information from the first I/O to the second networking element, and stopping, in the third networking element, transmission of data to the first I/O.

BRIEF DESCRIPTION OF THE DRAWINGS

In the following, three embodiments of the invention will be described with reference to the drawing wherein.

DETAILED DESCRIPTION

Figure 1:
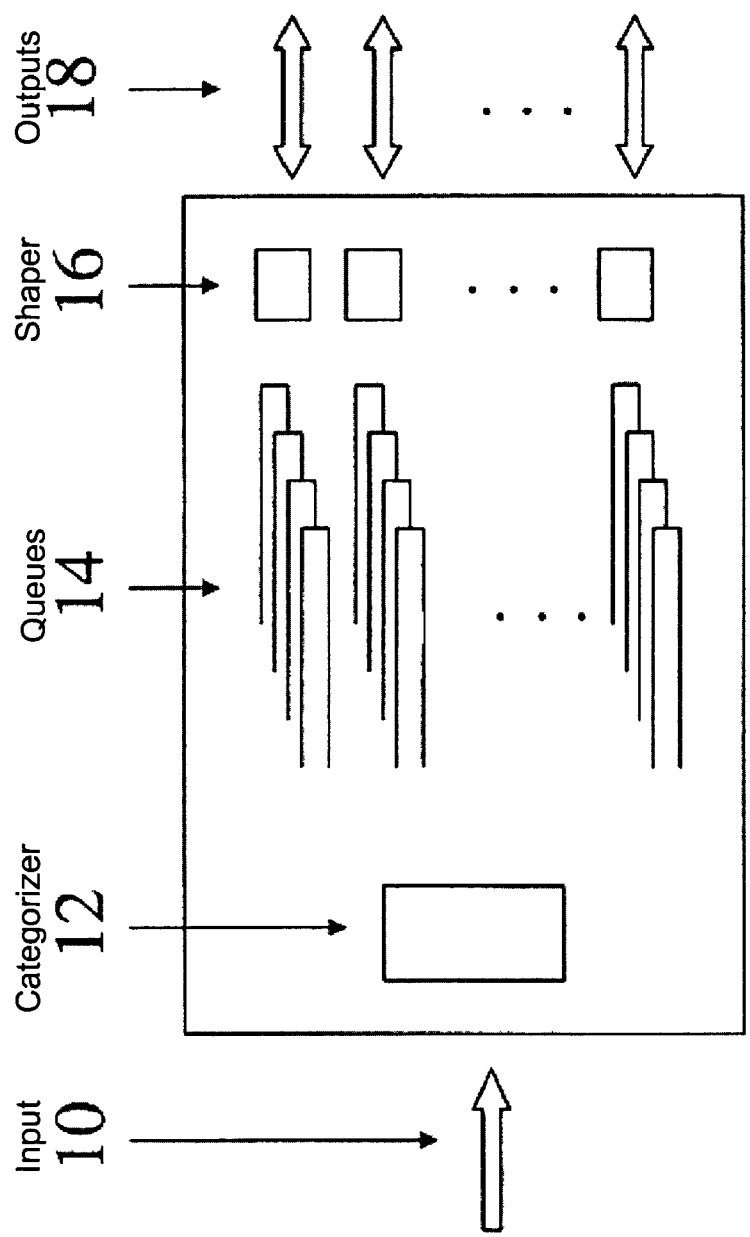
FIG. 1 illustrates a first embodiment of a device for receiving, processing and outputting data packets.

In FIG. 1, the device has an input 10 receiving data packets or frames from e.g. a data network or data provider. The device is able to categorize data packets or frames, in categorizer 12, into one of four priorities.

These packets or frames are analyzed or categorized in order to provide a priority for each. This categorization is performed on the basis of the contents of certain fields of the packet or frame. A suitable categorizer may be seen from the U.S. application Ser. No. 09/965,078 titled "A method and system for analyzing a data packet or frame" and filed on Sep. 28, 2001—and which is hereby incorporated by reference.

The input 10 may be one or a number of separate inputs receiving data packets or frames from a number of different networks or parts of a network (such as via a number of different networking elements).

The device further has a number of outputs 18, and four queues 14 (one for each priority) for each output 18.

The categorizer 12 is further adapted to determine which output a data packet or frame is to be output from and to transfer each categorized packet or frame into the queue 14 corresponding to the priority assigned and to the output determined.

The queues 14 may be implemented as a number of separate FIFO's.

Finally, a shaper 16 is provided for each output 18. Each shaper 16 is adapted to transfer data packets from the queues 14 to the corresponding output 18. The shaper 16 is adapted to transfer data packets or frames from that non-empty queue 14 having the highest priority to each output.

The arrows of the outputs 18 point in two directions in that the device is flow control enabled and therefore able to receive flow control information from networking units receiving the data packets or frames output from the device on outputs 18.

This networking information is used in the receiving shaper 16 to stop sending data packets or frames. Upon "reopening" of transmission, any later received high priority data packets or frames will be sent before lower priority packets or frames. In this manner, preference is made toward the higher priority packets, thus implementing Quality of Service and preventing Head of Line blocking.

It should be noted that the stopping of sending data may be only from one or more of the queues of an output. It may be desired that only lower priority data is stopped in order to give the receiver a chance of reducing its work load or the amount of data in its buffers but still maintain data flow at the higher priorities.

Figure 2:
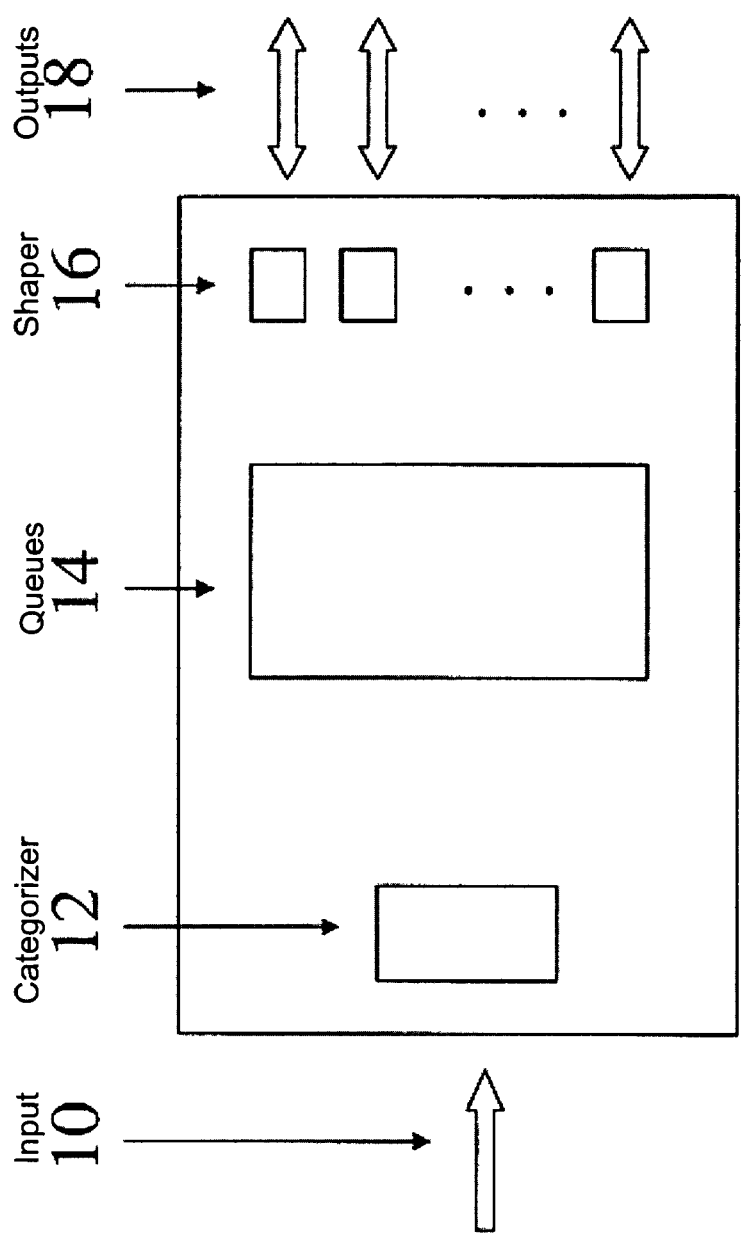
FIG. 2 illustrates a second embodiment of a device for receiving, processing and outputting data packets.

In FIG. 2, the queues 14 are implemented in a single memory block, such as a RAM, as linked lists. In this manner, the overall storage capacity required may be reduced.

Figure 3:
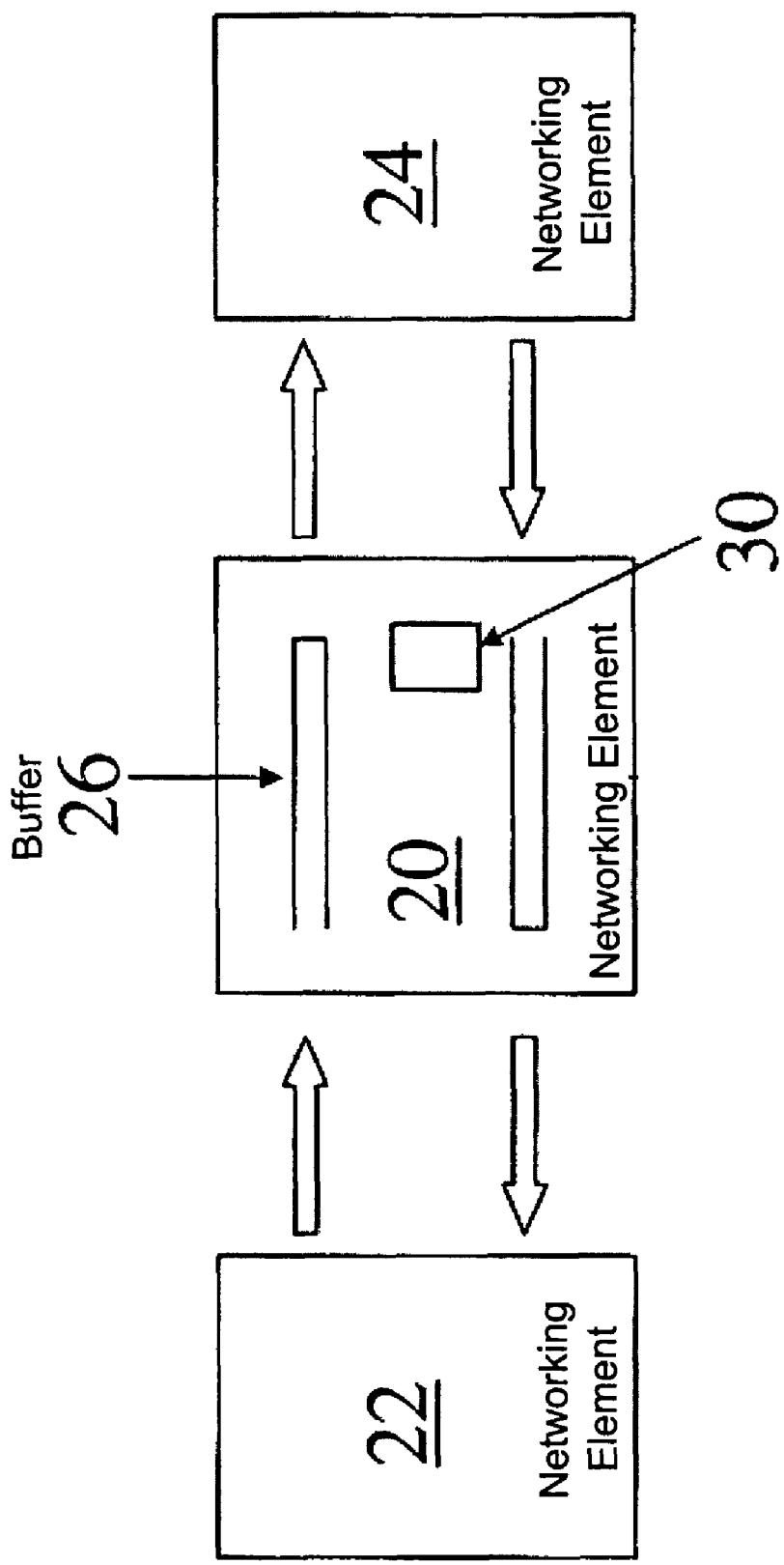
FIG. 3 illustrates a third embodiment of handling stopping/congestion information.

FIG. 3 illustrates a new manner of handling stopping/congestion information such as pause frames, flow control information or other congestion information transmitted between networking elements (such as switches, routers, bridges, MAC's or the like) in order to control data flow and to ensure that data is not lost.

The system of FIG. 3 comprises a networking element 20 according to the third aspect. This networking element communicates, via two-way links illustrated by arrows, with a second networking element 22 and a third networking element 24. The networking element 22 transmits data to the element 20, which transmits data to the element 24. Also, the element 24 is able to transmit stopping/congestion information to the element 22 via the element 20 in order to reduce or stop the amount of data transmitted.

Naturally, the data on the links may have different formats (such as Ethernet, SPI4v2, XAUI, XGMII, GMII, MII—or any other format—packet based, cell based, frame based) and the element 20 may perform any analysis or alteration thereof (in the means 30 or 26) before sending the data to the element 24.

Also, the stopping/congestion information transmitted form the element 24 may have any form—and a form different form that on which stopping/congestion information is transmitted between the elements 20 and 22.

The element 20 has, in this embodiment, a buffer 26 for buffering data received from the element 22 before transmission to the element 24. This buffer may have any size. In one embodiment where the link between the elements 22 and 20 is cell-based, and the communication between the elements 20 and 24 is frame based, the buffer has a size of at least one frame/packet of the largest possible size in that the frame needs to be assembled from the cells before transmission to the element 24.

When the element 24 transmits stopping/congestion information, the element 20 immediately transmits stopping/congestion information to the element 22. It should be noted that different types of stopping/congestion information may be used (such as for stopping all—or only part of the data traffic).

The element 22 will then stop transmission of data either for a predetermined period of time or until instructed to start transmission.

The element 20 may also stop (using means 30) transmitting data to the element 24 and instead buffer any data received in the buffer 26. Alternatively, the buffer 26 may be provided only for e.g. reassembly purposes and the element 20 will keep transmitting any data received to the element 24 which will then receive and buffer the data.

Thus, in the last situation, the element 20 may be a cut-through element not delaying the data transmission more than what is required for the analysis/alteration/reassembly necessarily handled by that element.

The invention claimed is:

1. A network element, comprising:
   a categorizer configured to assign one of a plurality of priorities to data packets received from a second network element at an input of the network element;
   a plurality of queues coupled to the categorizer. each queue of the plurality of queues associated with at least one of the plurality of priorities, and each queue configured to store the data packets assigned an associated priority;
   an output configured to transmit the data packets to a third network element and receive stopping information from the third network element; and
   a shaper configured to supply the data packets from the plurality of queues to the output, configured to receive the stopping information received by the output from the third network element, and configured to transmit the stopping information received by the output from the third network element to the second network element without regard to a status of the plurality of queues.

2. The network element of claim 1, wherein the shaper is further configured to stop supplying the data packets from at least one of the plurality of queues to the output after receiving the stopping information received by the output from the third network element.

3. The network element of claim 2, wherein the shaper is further configured to stop supplying the data packets from each of the plurality of queues to the output after receiving the stopping information received by the output from the third network element.

4. The network element of claim 1, wherein the shaper comprises an output queue configured to store the data packets from the plurality of queues for supply to the output.

5. The network element of claim 4, further comprising a memory configured to implement the output queue using a linked list.

6. The network element of claim 1, wherein the shaper is further configured to supply the data packets from one of the plurality of queues associated with a high priority to the output before supplying the data packets from one of the plurality of queues associated with a low priority to the output.

7. The network element of claim 1, further comprising a memory configured to implement each queue of the plurality of queues using a linked list.

8. The network element of claim 1, wherein the plurality of queues is configured to store an amount of data that is a function of a transmission rate and distance traveled the data packets travel from the second network element to the network element.

9. A method for providing quality of service in a network element, the method comprising:
   receiving data packets from a second network element;
   assigning one of plurality of priorities to each of the received data packets;
   queuing the data packets in queues according to the assigned priorities;
   transmitting the queued data packets to a third network element based on the assigned priorities;
   receiving stopping information from the third network element; and
   transmitting the stopping information to the second network element independently of the amount of data queued.

10. The method of claim 9, further comprising, after receipt of the stopping information, stopping transmitting the queued data packets assigned at least one of the plurality of priorities to the third network element.

11. The method of claim 9, further comprising, after receipt of the stopping information stopping transmitting the queued data packets to the third network element.

12. The method of claim 9, wherein transmitting the stopping information to the second network element occurs without substantial delay after receiving stopping information from the third network element.

13. The method of claim 9, wherein transmitting the queued data packets to a third network element comprising transmitting data packets from a queue having high priority data packets before transmitting data packets from a queue having low priority data packets.

14. The method of claim 9, wherein queuing the data packets comprises storing the data packets in a memory configured to implement the queues using linked lists.

* * * * *